(12) United States Patent
Li et al.

(10) Patent No.: US 6,292,373 B1
(45) Date of Patent: Sep. 18, 2001

(54) ELECTROMAGNETIC INTERFERENCE (EMI) SHIELD FOR A DISK DRIVE

(75) Inventors: Hong Li, Carol Stream; Douglas J. Pogatetz, Arlington Heights; Amir Koradia, Palatine, all of IL (US)

(73) Assignee: 3Com Corporation, Rolling Meadows, IL (US)

( * ) Notice: Subject to any disclaimer, the term of this patent is extended or adjusted under 35 U.S.C. 154(b) by 0 days.

(21) Appl. No.: 09/360,389

(22) Filed: Jul. 23, 1999

(51) Int. Cl.[7] ........................................... H05K 7/18
(52) U.S. Cl. ..................... 361/800; 361/816; 361/818; 174/35; 174/51 R
(58) Field of Search ............................ 361/800, 801, 361/685, 816, 818, 714, 730, 752, 753, 796; 174/35 R, 35 MS, 35 GS; 206/719; 439/607–610

(56) References Cited

U.S. PATENT DOCUMENTS

| | | | |
|---|---|---|---|
| 5,175,395 | * | 12/1992 | Moore ................................ 174/35 R |
| 5,349,132 | * | 9/1994 | Miller et al. ........................ 174/35 R |
| 5,726,864 | * | 3/1998 | Copeland et al. .................... 361/800 |
| 5,808,237 | * | 9/1998 | Hancock ............................. 174/35 R |
| 6,005,768 | * | 12/1999 | Jo ....................................... 361/685 |
| 6,102,708 | * | 8/2000 | Kimura .................................. 439/64 |

* cited by examiner

*Primary Examiner*—Jeffrey Gaffin
*Assistant Examiner*—Hung Bui
(74) *Attorney, Agent, or Firm*—Baniak Pine & Gannon

(57) ABSTRACT

An apparatus and method for shielding electromagnetic interference (EMI) for a disk drive includes a body portion for operatively securing to the disk drive. The body portion includes a flange portion. The flange portion includes a plurality of tab portions that substantially surround a perimeter portion of the body portion to allow a force applied to the body portion to deflect the plurality of tab portions and bias the plurality of tab portions against a contact surface to form a positive contact between the plurality of tab portions and the contact surface thereby shielding EMI.

23 Claims, 6 Drawing Sheets

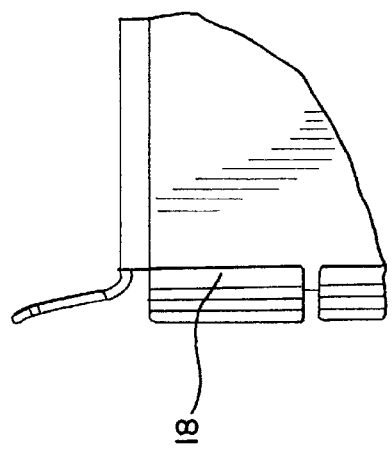
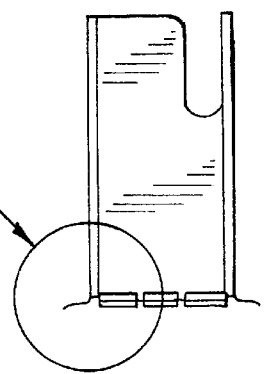
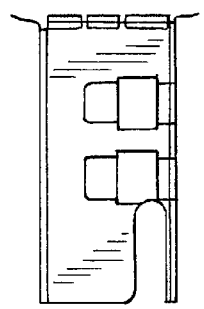
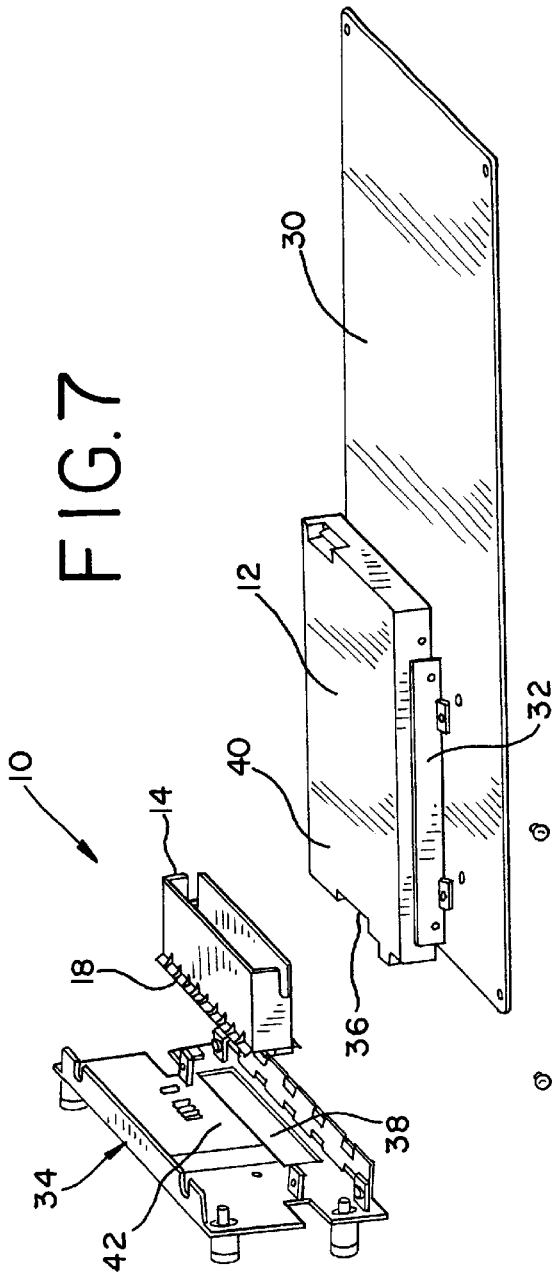

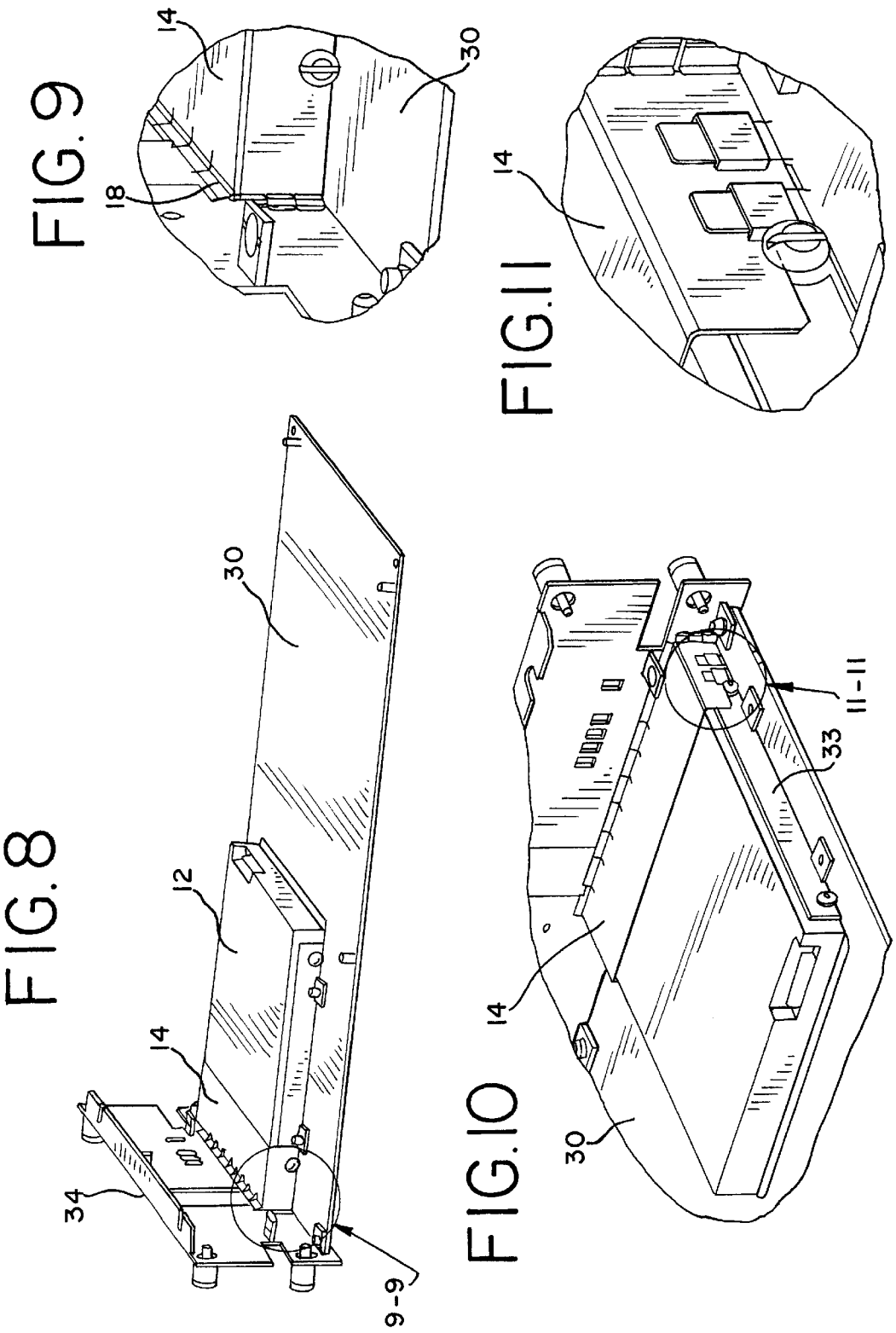

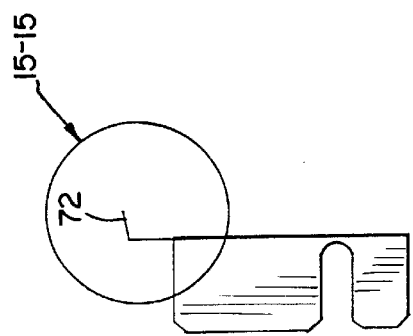
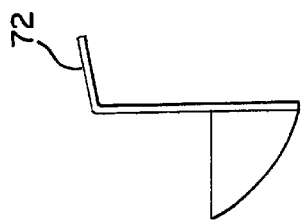
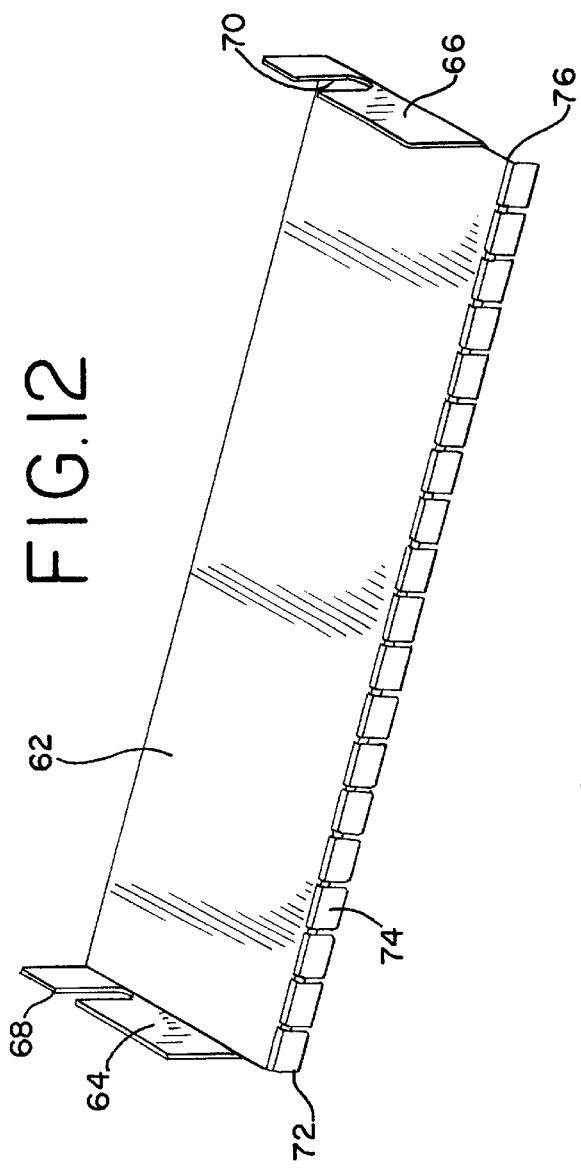
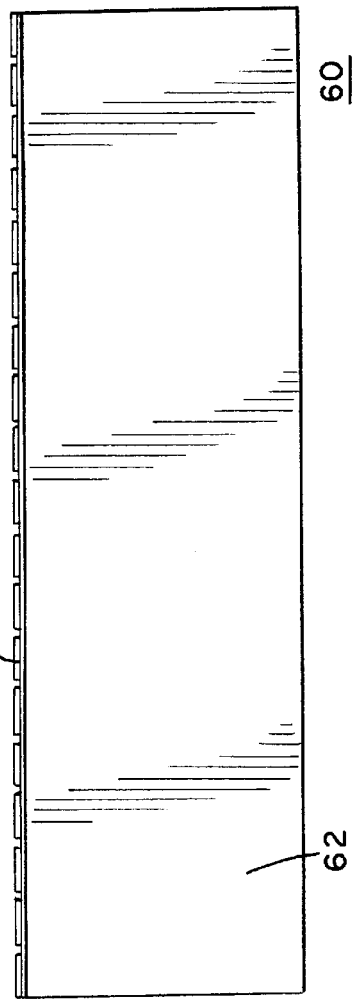

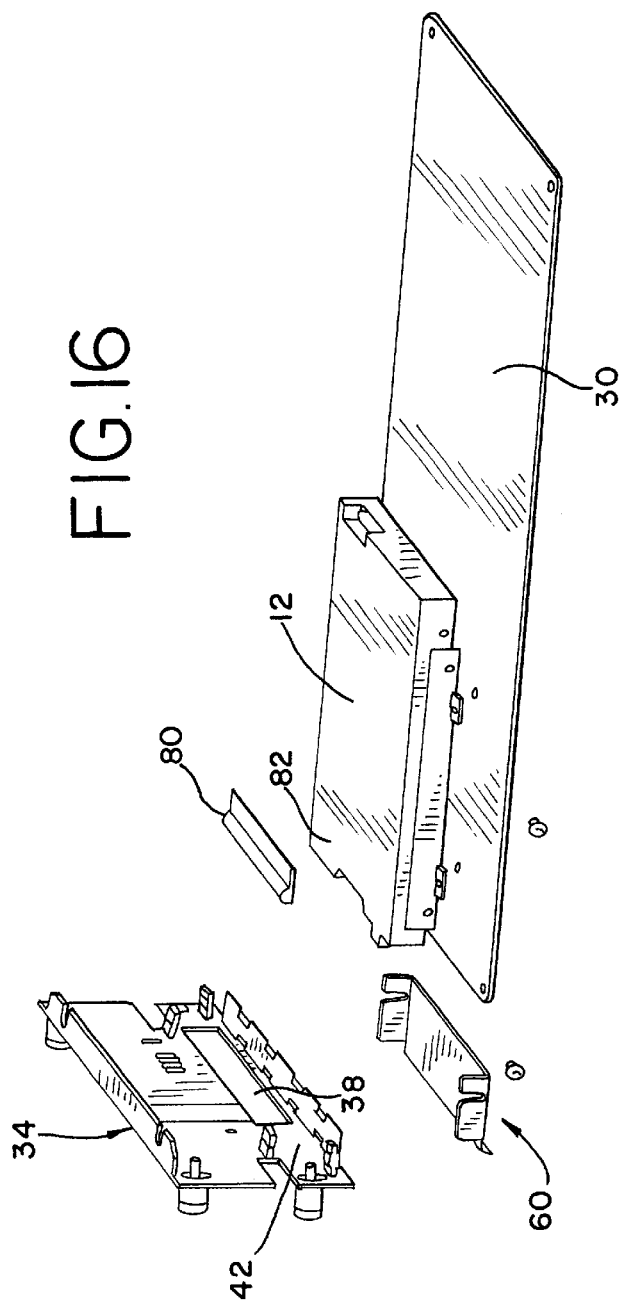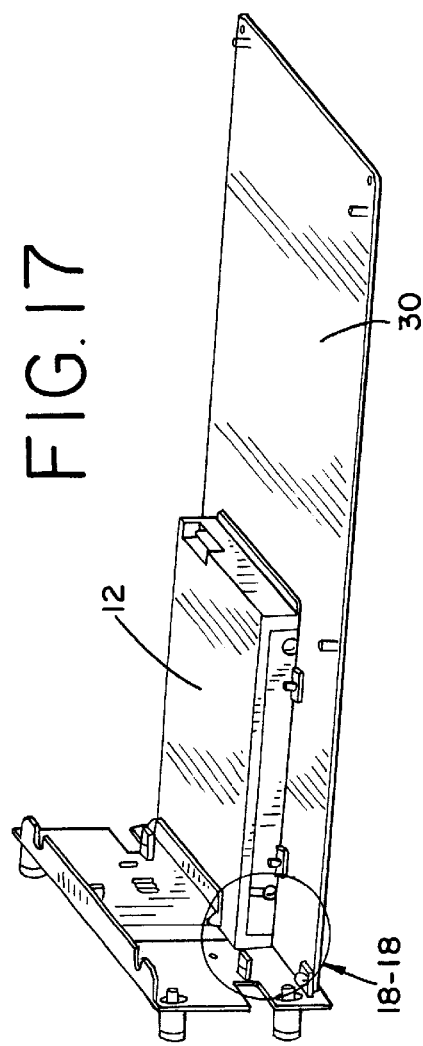

ELECTROMAGNETIC INTERFERENCE (EMI) SHIELD FOR A DISK DRIVE

FIELD OF THE INVENTION

This invention relates generally to the field of electromagnetic interference (EMI) shields and, in particular, to an EMI shield for a disk drive.

BACKGROUND OF THE INVENTION

Electronic chassis that house electronic components for high-speed telecommunications and networking applications typically include a plurality of circuit board assemblies. Each circuit board assembly includes a circuit board that is attached to a channel-shaped mounting bracket.

In certain applications, a disk drive (such as, for example, a floppy disk drive or a CD ROM disk drive) is mounted onto the circuit board of a circuit board assembly. The disk drive is positioned on the circuit board so that its receiving end is aligned with an opening formed in the mounting bracket. This arrangement allows an operator to access the receiving end of the disk drive to allow the insertion and ejection of a disk. However, there are several disadvantages to this arrangement.

In particular, in many instances gaps are created between the disk drive and the opening in the mounting bracket due to parts which are out of tolerance. As a result, excessive amounts of electromagnetic radiation generated by the internal electronic components within the electronic chassis may leak out of the chassis through the gaps formed between the disk drive and the mounting bracket. Excessive electromagnetic interference (EMI) is a widespread problem in many electronic chassis applications, especially in the high-speed network systems products. These electronic chassis must meet very stringent regulatory emissions standards in the United States and in other foreign countries.

Attempts have been made to provide shielding devices to reduce EMI emissions that exit through gaps between the disk drive and the mounting bracket. For example, Beryllium copper gaskets and metallic coated fiber gaskets have been used in an attempt to reduce EMI emissions. However, there are many disadvantages with these solutions, including the high costs associated with these materials. In addition, these conventional gasket designs are typically difficult to fabricate which results in increased manufacturing costs. Moreover, these gaskets typically do not provide a consistent positive and continuous contact between the disk drive and the mounting bracket. As a result, conventional solutions typically do not provide effective EMI shielding.

Accordingly, it would be desirable to have an EMI shield that overcomes the disadvantages described above, and to provide a simple and cost effective EMI shield for a disk drive.

SUMMARY OF THE INVENTION

One aspect of the invention provides an electromagnetic interference (EMI) shield for a disk drive including a body portion for operatively securing to the disk drive. The body portion includes a flange portion having a plurality of tab portions. The plurality of tab portions substantially surrounds a perimeter portion of the body portion to allow a force applied to the body portion to deflect the plurality of tab portions and bias the plurality of tab portions against a contact surface to form a positive contact between the plurality of tab portions and the contact surface thereby shielding EMI. The plurality of tab portions may preferably be angled with respect to the contact surface to allow the plurality of tab portions to deflect when the force is applied to the body portion to form the positive contact between the plurality of tab portions and the contact surface. Each of the plurality of tab portions may preferably be angled at least about three degrees from the contact surface. The body portion may preferably have a rectangular-shape including a top wall, a bottom wall, a first side wall and a second side wall. The body portion may preferably be formed from a single piece of conductive material such as, for example, tin-plated cold rolled steel. The first and second side walls may each preferably include an opening to allow the body portion to be operatively secured to the disk drive. The opening may preferably be a slot.

Another aspect of the invention provides an electromagnetic interference (EMI) shield for a disk drive. A circuit board is operatively secured to a bracket and a disk drive is operatively secured to the circuit board. A body portion is operatively secured to the disk drive. The body portion includes a flange portion having a plurality of tab portions. The plurality of tab portions substantially surrounds a perimeter portion of the body portion to allow a force applied to the body portion in a direction toward the bracket to deflect the plurality of tab portions and bias the plurality of tab portions against a contact surface of the bracket to form a positive contact between the plurality of tab portions and the contact surface. Electromagnetic radiation is thereby prevented from exiting through an opening in the bracket. Each of the plurality of tab portions may preferably be angled with respect to the contact surface of the bracket to allow the plurality of tab portions to deflect when the force is applied to the body portion to form the positive contact between the plurality of tab portions and the contact surface of the bracket. Each of the plurality of flange portions may preferably be angled at least about three degrees from the contact surface of the bracket. The body portion may preferably have a rectangular-shape including a top wall, a bottom wall, a first side wall, and a second end wall.

Another aspect of the invention provides a method of shielding electromagnetic interference (EMI) for a disk drive. A circuit board and a disk drive operatively secured to the circuit board are provided. A body portion is operatively secured to the disk drive. The body portion includes a flange portion having a plurality of tab portions. The plurality of tab portions substantially surrounds a perimeter portion of the body portion. A force is applied to the body portion and the plurality of tab portions is deflected. The plurality of tab portions is biased against a contact surface of a bracket. A positive contact is formed between the plurality of tab portions and the contact surface of the bracket. Electromagnetic radiation is prevented from exiting through an opening in the bracket. The force may preferably be applied to the body portion in a direction toward the bracket. The circuit board may preferably be operatively secured to the bracket.

Another aspect of the invention provides an electromagnetic interference (EMI) shield for a disk drive including a body portion for operatively securing to the disk drive. The body portion includes a flange portion having a plurality of tab portions. The plurality of tab portions is positioned along a longitudinal side of the body portion to allow a force applied to the body portion to deflect the plurality of tab portions and bias the plurality of tab portions against a contact surface to form a positive contact between the plurality of tab portions and the contact surface thereby shielding EMI. The plurality of tab portions may preferably be angled with respect to the contact surface to allow the plurality of tab portions to deflect when the force is applied to the body portion to form the positive contact between the plurality of tab portions and the contact surface. Each of the plurality of tab portions may preferably be angled at least about three degrees from the contact surface. The body portion may preferably have a generally planar-shape including a first side wall and a second side wall. Each of the first and second side walls may preferably include an opening to allow the body portion to be operatively secured to the disk drive. The opening may preferably be a slot. The body portion may preferably be formed from a single piece of conductive material such as, for example, tin-plated cold rolled steel.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE DRAWINGS

FIG. 4 is a right side view of the embodiment of FIG. 1.

FIG. 5 is a left side view of the embodiment of FIG. 1;

FIG. 6 is an enlarged exploded view of the circled region 6—6 of FIG. 5;.

FIG. 7 is an exploded perspective view of the EMI shield of FIG. 1, a conventional faceplate bracket, and a conventional disk drive mounted to a circuit board;

FIG. 8 is an assembled view of FIG. 7;

FIG. 9 is an enlarged view of the region circled 9—9 of FIG. 8;

FIG. 10 is an enlarged right side perspective (partial) view of the embodiment of FIG. 8;

FIG. 11 is an enlarged view of the region circled 11—11 of FIG. 10;

FIG. 12 is a perspective view of an alternative embodiment of an electromagnetic interference (EMI) shield for a disk drive made in accordance with the invention;

FIG. 13 is a top view of the embodiment of FIG. 12;

FIG. 14 is a side view of the embodiment of FIG. 12;

FIG. 15 is an enlarged view of the region circled 15—15 of FIG. 14;

FIG. 16 is an exploded perspective view of the EMI shield of FIG. 12, a conventional faceplate bracket, and a conventional disk drive mounted to a circuit board;

FIG. 17 is an assembled view of FIG. 16;

DETAILED DESCRIPTION OF THE PRESENTLY PREFERRED EMBODIMENTS

Figure 1:
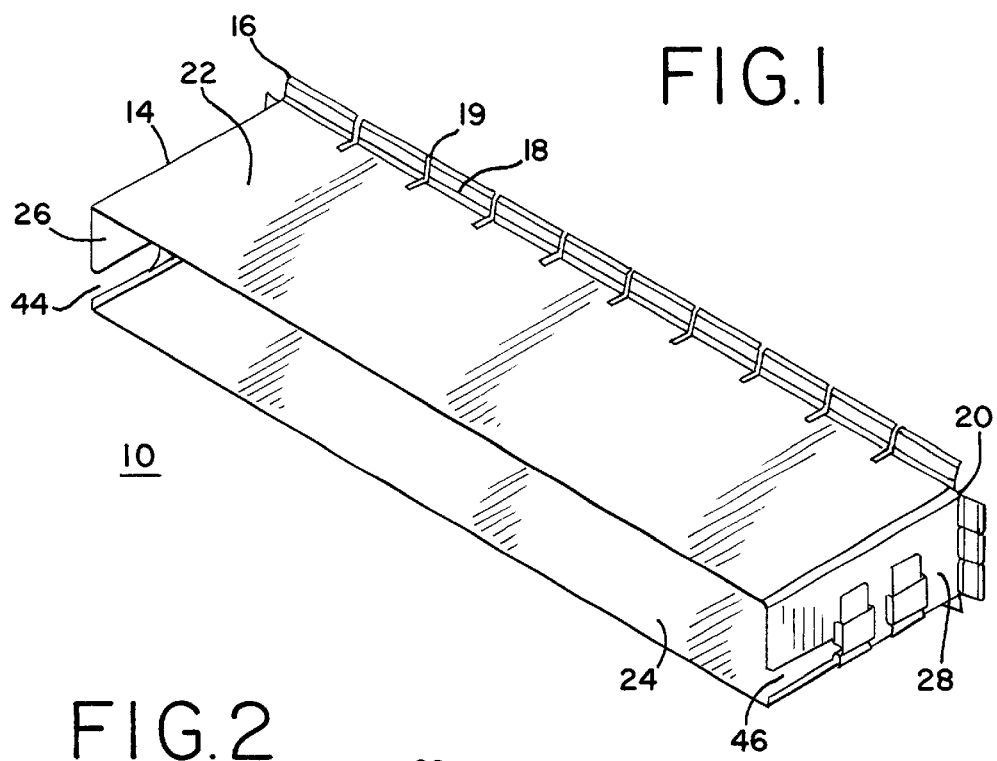
FIG. 1 is a perspective view of a preferred embodiment of an electromagnetic interference (EMI) shield for a disk drive that is made in accordance with the invention.
Figure 2:
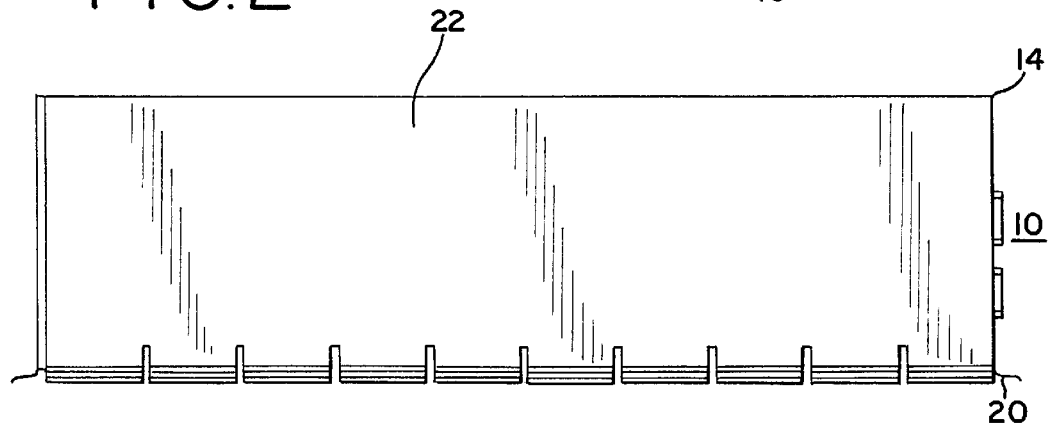
FIG. 2 is a top view of the embodiment of FIG. 1.
Figure 3:
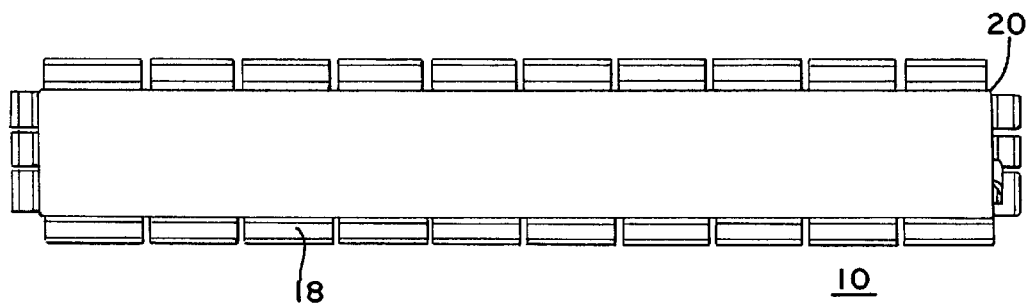
FIG. 3 is a back view of the embodiment of FIG. 1.
Figure 18:
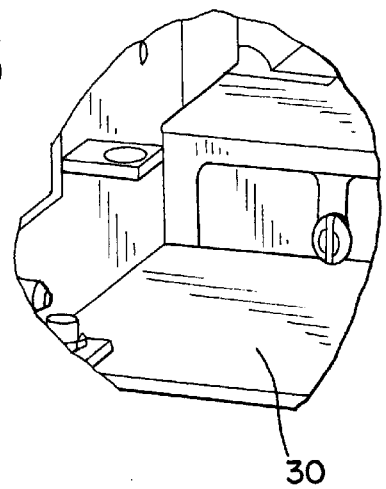
FIG. 18 is an enlarged view of the region circled 18—18 of FIG. 17.
Figure 19:
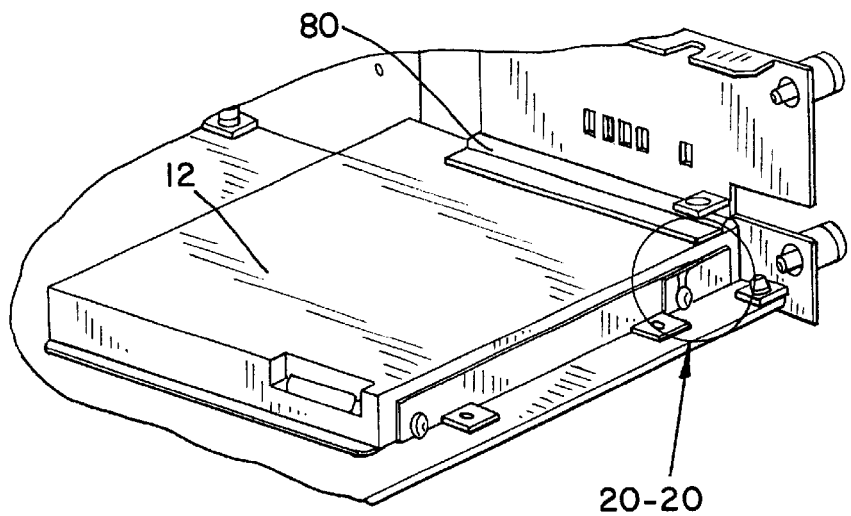
FIG. 19 is an enlarged right side perspective (partial) view of the embodient of FIG. 17.
Figure 20:
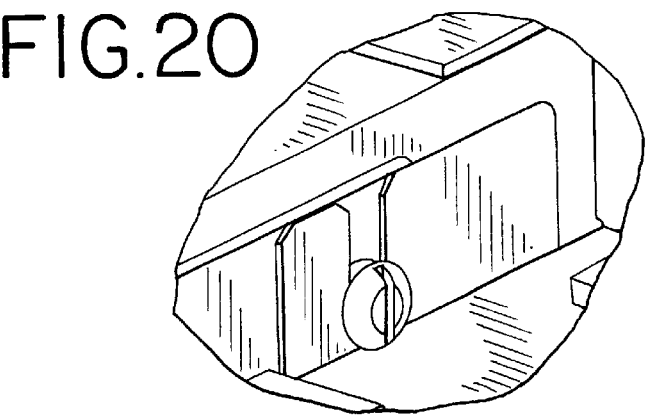
FIG. 20 is an enlarged view of the region circled 20—20 of FIG. 19.

As shown in FIGS. 1–6, a preferred embodiment of an electromagnetic interference (EMI) shield 10 for a disk drive 12 (see FIGS. 7–11) includes a body portion 14. Referring to FIGS. 1–6, the body portion 14 of the EMI shield 10 includes a flange portion 16. The flange portion 16 includes a plurality of tab portions 18 that substantially surround a perimeter portion 20 of the body portion 14. The plurality of tab portions 18 may preferably be formed by a plurality of slits 19 that also substantially surround the perimeter portion 20 of the body portion 14. The plurality of flange portions 18 created by the plurality of slits 19 may preferably be rectangular in shape, although other shapes and configurations are contemplated. Similarly the body portion 14 may preferably have a rectangular-shape and may preferably include a top wall 22, a bottom wall 24, a first side wall 26 and a second side wall 28. Alternatively, the body portion 14 may have other shapes and configurations depending upon the shape and configuration of the disk drive 12 (see FIGS. 7–11). The body portion 14 of the EMI shield 10 may preferably be formed from a single piece of conductive material such as, for example, tin-plated cold rolled steel. However, the use of other types of conductive materials for the body portion 14 is contemplated. The one-piece design of the EMI shield 10 simplifies the fabrication process thereby reducing manufacturing costs. Moreover, the relatively low cost of tin-plated cold rolled steel provides a cost effective and economical solution for eliminating unacceptable amounts of electromagnetic interference.

Referring to FIGS. 7–11, the disk drive 12 is operatively secured to a circuit board 30. The disk drive 12 may preferably be secured to the circuit board 30 by any conventional means. As shown in FIGS. 7–8 and 10, for example, conventional mounting brackets 32, 33 may preferably be used to secure the disk drive 12 to the circuit board 30. The disk drive 12 may preferably be any conventional disk drive such as, for example, a floppy disk drive. The circuit board 30 may preferably be any conventional printed circuit board.

Referring again to FIGS. 7–11, the circuit board 30 is operatively secured to a faceplate bracket 34. The circuit board 30 may preferably be secured to the bracket 34 by any conventional means such as, for example, screws or bolts. The disk drive 12 is positioned on the circuit board 30 so that the receiving end 36 of the disk drive 12 is aligned with an opening 38 in the bracket 34 when the circuit board 30 is attached to the bracket 34. The body portion 14 of the EMI shield 10 is operatively secured to the disk drive 12. In the embodiment shown, for example, the body portion 14 is inserted over an end portion 40 of the disk drive 12. When assembled, the plurality of tab portions 18 is positioned around the opening 38 in the bracket 34.

During assembly of the circuit board 30, the disk drive 12, the EMI shield 10, and the bracket 34, a force is applied to the body portion 14 of the EMI shield 10. The force may preferably be applied to the body portion 14 in a direction toward the bracket 34. This causes the plurality of tab portions 18 to come in contact with a contact surface 42 of the bracket 34. The force applied to the body portion 14 also deflects the plurality of tab portions 18 and biases the plurality of tab portions 18 against the contact surface 42 of the bracket 34 to form a positive contact between the plurality of tab portions 18 and the contact surface 42. The advantage of this arrangement is that the EMI shield 10 provides a positive and continuous contact between the disk drive 12 and the contact surface 42 of the bracket 34 even if the various components are out of tolerance. The EMI shield 10 assists in preventing electromagnetic radiation from exiting through the opening 38 in the bracket 34 thereby reducing electromagnetic interference emissions to the level required by the Federal Communications Commission (FCC) and other regulations.

Referring again to FIGS. 1–6, the plurality of tab portions 18 may preferably be angled with respect to the contact surface 42 of the bracket 32. This allows the plurality of tab portions 18 to deflect when the force is applied to the body portion 14 of the EMI shield 10. This in turn results in a positive contact between the plurality of tab portions 18 and the contact surface 42 of the bracket 34. Each of the plurality of tab portions 18 may preferably be angled at least about three degrees from the contact surface 42 of the bracket 34. However, other angles may be used depending upon the particular application. In the embodiment shown, the contact surface 42 is the inside surface of the bracket 34.

As shown in FIG. 1, the first and second side walls 26, 28 of the body portion 14 each include openings 44, 46, respectively, to allow the body portion 14 of the EMI shield 10 to be operatively secured to the disk drive 12. In the embodiment shown in FIGS. 7–11, for example, body portion 14 is attached to the mounting brackets 32, 33 for the disk drive 12 with conventional screws or bolts. As shown in FIG. 1, the openings 44, 46 each may preferably be configured as a slot, although other configurations for the openings 44, 46 are contemplated.

FIGS. 12–15 illustrate an alternative preferred embodiment of an electromagnetic interference (EMI) shield 60 for the disk drive 12. The EMI shield 60 includes a body portion 62 for operatively securing to the disk drive 12 (see FIGS. 16–20). In the embodiment shown in FIGS. 12–13, the body portion 62 has a generally planar-shape including a first side wall 64 and a second side wall 66. The first and second side walls 64, 66 each include openings 68, 70, respectively, to allow the body portion 62 to be operatively secured to the disk drive 12. The openings 68, 70 may each be configured as a slot. The body portion 62 may preferably be formed from a single piece of conductive material, such as, for example, tin-plated cold rolled steel. However, other conductive materials for the body portion 62 are contemplated.

Referring to FIGS. 12–15, the body portion 62 includes a flange portion 72 having a plurality of tab portions 74. The plurality of tab portions 74 are positioned along a longitudinal side 76 (see FIG. 12) of the body portion 62 to allow a force applied to the body portion 62 to deflect the plurality of tab portions 74. The plurality of tab portions 74 are biased against the contact surface 42 of the bracket 34 to form a positive contact between the plurality of tab portions 74 and the contact surface 42 thereby shielding EMI. In particular, electromagnetic radiation is prevented from exiting through the opening 38 in the bracket 42.

The plurality of tab portions 74 may preferably be angled with respect to the contact surface 42 to allow the plurality of tab portions 74 to deflect when the force is applied to the body portion 62. This in turn forms a positive contact between the plurality of tab portions 74 and the contact surface 42 of the bracket 34. Each of the plurality of tab portions 74 may preferably be angled at least about three degrees from the contact surface 42 of the bracket 34.

As shown in FIGS. 16–20, a conductive fiber strip 80 may preferably be positioned on a top surface 82 of the disk drive 12 adjacent to and contacting the contact surface 42 of the bracket 34. This further prevents electromagnetic radiation from exiting through the opening 38 in the bracket 34.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. An electromagnetic interference (EMI) shield for a disk drive comprising:

a body portion for operatively securing to the disk drive, the body portion including a perimeter portion for contacting an inside surface of a cover plate, the perimeter portion including a flange portion extending along the perimeter portion, the flange portion including a plurality of tab portions spaced apart along the flange portion and substantially surrounding the perimeter portion to allow a force applied to the body portion to deflect the plurality of tab portions and bias the plurality of tab portions against the inner surface of the cover plate to form a positive contact between the plurality of tab portions and the inner surface of the cover plate to prevent EMI from passing through an opening in the cover plate.

2. The apparatus of claim 1 wherein the plurality of tab portions are angled with respect to the contact surface to allow the plurality of tab portions to deflect when the force is applied to the body portion to form the positive contact between the plurality of tab portions and the contact surface.

3. The apparatus of claim 2 wherein each of the plurality of tab portions is angled at least about three degrees from the contact surface.

4. The apparatus of claim 1 wherein the body portion has a rectangular-shape including a top wall, a bottom wall, a first side wall and a second side wall.

5. The apparatus of claim 4 wherein each of the first and second side walls include an opening to allow the body portion to be operatively secured to the disk drive.

6. The apparatus of claim 5 wherein the opening is a slot.

7. The apparatus of claim 1 wherein the body portion is formed from a single piece of conductive material.

8. The apparatus of claim 7 wherein the conductive material is tin-plated cold rolled steel.

9. An electromagnetic interference (EMI) shield for a disk drive comprising:

a circuit board operatively secured to a cover plate, a disk drive operatively secured to the circuit board, and a body portion operatively secured to the disk drive, the body portion including a perimeter portion for contacting an inside surface of the cover plate, the perimeter portion including a flange portion extending along the perimeter portion, the flange portion including a plurality of tab portions spaced apart along the flange portion and substantially surrounding the perimeter portion to allow a force applied to the body portion in a direction toward the bracket to deflect the plurality of tab portions and bias the plurality of tab portions against the inner surface of the cover plate to form a positive contact between the plurality of tab portions and the inner surface of the cover plate thereby preventing electromagnetic radiation from exiting through an opening in the cover plate.

10. The apparatus of claim 9 wherein each of the plurality of tab portions is angled with respect to the contact surface of the bracket to allow the plurality of tab portions to deflect when the force is applied to the body portion to form the positive contact between the plurality of tab portions and the contact surface of the bracket.

11. The apparatus of claim 10 wherein each of the plurality the flange portions is angled at least about three degrees from the contact surface of the bracket.

12. The apparatus of claim 9 wherein the body portion has a rectangular-shape including a top wall, a bottom wall, a first side wall, and a second end wall.

13. A method of shielding electromagnetic interference (EMI) for a disk drive comprising the steps of:

providing a circuit board, a disk drive operatively secured to the circuit board, and a body portion operatively secured to the disk drive, the body portion including a perimeter portion, the perimeter portion including a flange portion extending along the perimeter portion, the flange portion including a plurality of tab portions spaced apart along the flange portion and substantially surrounding the perimeter portion;

applying a force to the body portion;

deflecting the plurality of tab portions;

biasing the plurality of tab portions against the inner surface of the cover plate;

forming a positive contact between the plurality of tab portions and the inner surface of the cover plate; and preventing electromagnetic radiation from exiting through an opening in the cover plate.

14. The method of claim 13 wherein the force is applied to the body portion in a direction toward the bracket.

15. The method of claim 13 further comprising:

operatively securing the circuit board to the bracket.

16. An electromagnetic interference (EMI) shield for a disk drive comprising:

a body portion for operatively securing to the disk drive, the body portion including a longitudinal side having a length for contacting an inside surface of a cover plate, the longitudinal side including a flange portion extending along the longitudinal side, the flange portion including a plurality of tab portions spaced apart along the flange portion and extending continuously along the length of the longitudinal side to allow a force applied to the body portion to deflect the plurality of tab portions and bias the plurality of tab portions against the inside surface of the cover plate to form a positive contact between the plurality of tab portions and the inside surface of the cover plate to prevent EMI from passing through an opening in the cover plate.

17. The apparatus of claim 16 wherein the plurality of tab portions are angled with respect to the contact surface to allow the plurality of tab portions to deflect when the force is applied to the body portion to form the positive contact between the plurality of tab portions and the contact surface.

18. The apparatus of claim 17 wherein each of the plurality of tab portions is angled at least about three degrees from the contact surface.

19. The apparatus of claim 16 wherein the body portion has a generally planar-shape including a first side wall and a second side wall.

20. The apparatus of claim 19 wherein each of the first and second side walls include an opening to allow the body portion to be operatively secured to the disk drive.

21. The apparatus of claim 20 wherein the opening is a slot.

22. The apparatus of claim 16 wherein the body portion is formed from a single piece of conductive material.

23. The apparatus of claim 22 wherein the conductive material is tin-plated cold rolled steel.

* * * * *